2 Sheets--Sheet 1.
W. F. COCHRANE.
Machine for Bolting Flour.
No. 6,594. Reissued Aug. 17, 1875.
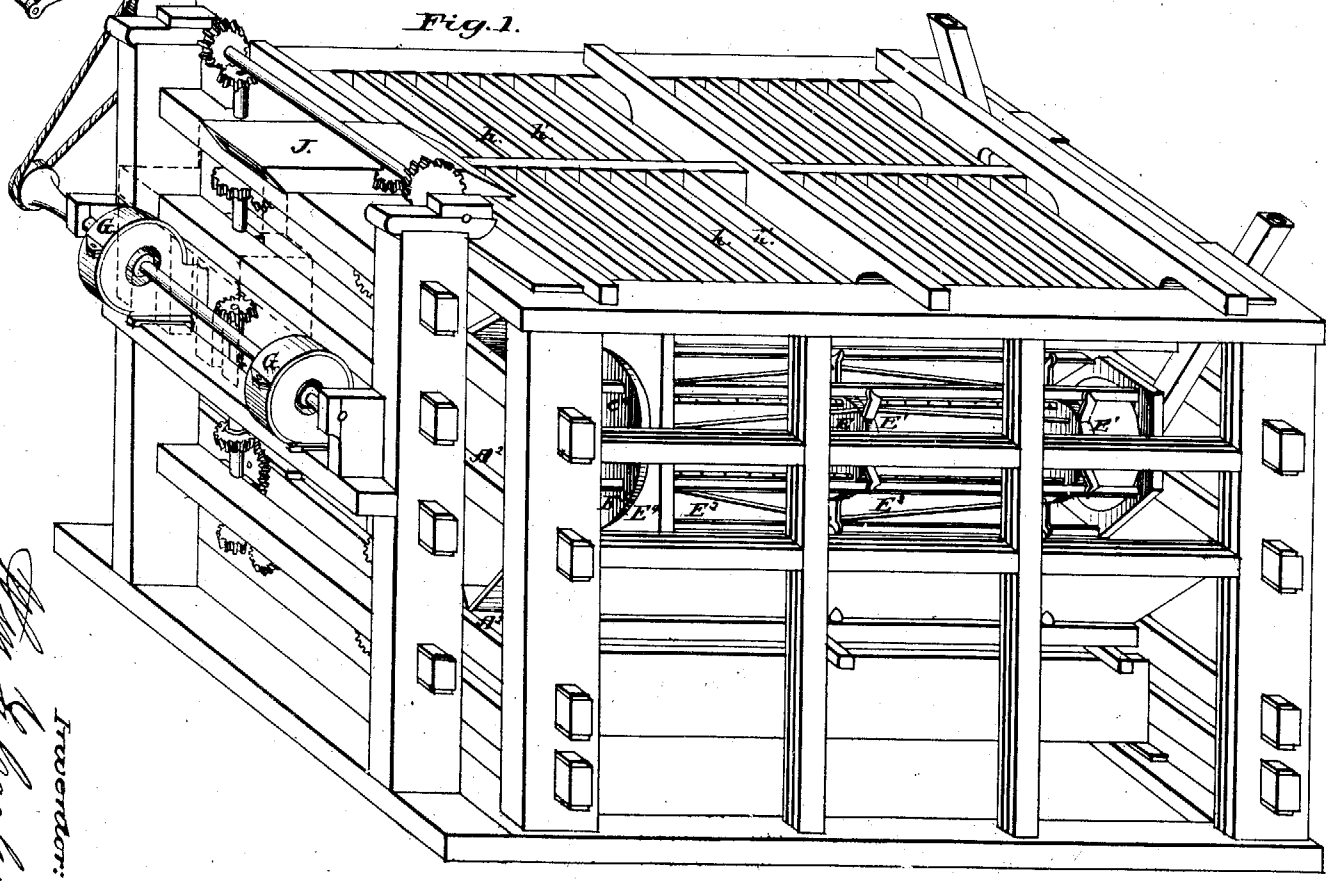
Witnesses
A. Ruppert.
R. Mason
Inventor:
Wm. F. Cochrane

W. F. COCHRANE.
Machine for Bolting Flour.
No. 6,594. Reissued Aug. 17, 1875.
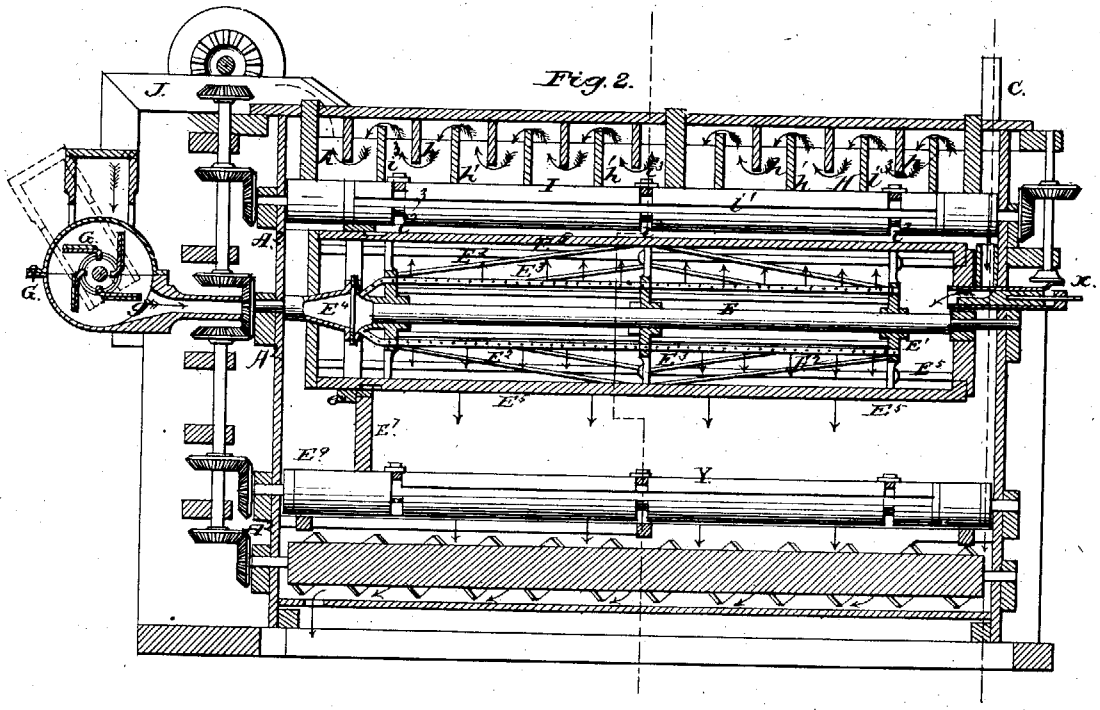
Witnesses:
R. M. Mason
A. Ruppert.
Inventor:
Wm. F. Cochrane

UNITED STATES PATENT OFFICE.

WILLIAM F. COCHRANE, OF LA FAYETTE, INDIANA, ASSIGNOR, BY MESNE ASSIGNMENTS, TO HIMSELF, RODNEY MASON, AND WILLIAM WARDER.

IMPROVEMENT IN MACHINES FOR BOLTING FLOUR.

Specification forming part of Letters Patent No. 37,321, dated January 6, 1863; reissue No. 6,029, dated August 25, 1874; reissue No. 6,594, dated August 17, 1875; application filed July 26, 1875.

DIVISION A.

*To all whom it may concern:*

Be it known that I, WILLIAM F. COCHRANE, of La Fayette, in the county of Tippecanoe and State of Indiana, late of Springfield, in the county of Clarke and State of Ohio, have invented new and useful Improvements in Machines for Bolting Flour; and I do hereby declare that the following is a full, clear, and exact description of the same, reference being had to the annexed drawing, making part of this specification, in which—

Figure 1 is a perspective view with the panels removed to show the interior structure, and Fig. 2 is a vertical longitudinal section.

In manufacturing flour heretofore screens or bolts have been employed, consisting of a frame covered with a reticulated cloth of wire or threads of silk, the latter being covered with a gum for the purpose of making the thread firm, and thus maintaining the uniformity of the interstices; but, as the heat and vapor evolved in the operation of grinding the grain into meal tend to soften this gum, it has been a frequent source of embarrassment to the miller that his cloths become "clouded" by the adhesion of fine particles of the meal, so that resort has been had to brushes and currents of atmospheric air for the purpose of keeping the meshes clear.

In the use of atmospheric bolts it is obvious that, if the air is allowed to escape freely, there will be much of the finer portion of the meal carried away by the blast and wasted, and this loss has heretofore prevented the general use of such bolts, notwithstanding the obvious advantages attending such a use of the air.

To avoid this difficulty is the main purpose of my invention, as illustrated in this case, and in other patents founded upon applications simultaneously filed.

To this end the invention embraced in this patent consists, first, in combining with the bolt and blast-pipes, and mechanism for allowing the meal to pass without the air passing therewith at the same time, a collecting-chamber placed in the air-eduction passages for causing the deposition of the light particles carried with the current before the final escape of the air. In this case the eduction-pipe opens out of the collecting-chamber, so that the air, before being returned, may be purified by deposition of the heavier particles, which may be returned to the bolting-chest or carried away, according to circumstances, at the will of the operator.

This part of my invention consists, therefore, secondly, in combining, with the screen and blast and suction pipes, a collecting or deposit chamber in the air-eduction passages, wherein the specifically heavier particles carried out of the chest with the atmospheric current are deposited in the dead-air corners by gravity.

In this connection I wish to state that I do not wish to claim in this patent, broadly, in this combination, all forms of a separation or collecting chamber, as another form of collection-chamber is shown and claimed as an element in a combination in another patent of even date, but merely for a deposit-chamber in which the separation is made by gravity.

To carry out the objects of my invention in the most perfect manner, I have found it necessary to remodel almost entirely the bolting-chests heretofore used. I construct the frame of the bolting-chest of stout timbers, united by mortises and tenons, and held together by screws or bolts in such manner as to admit of their being readily taken apart or put together again. Above the chest I construct a chamber extending the whole length of the frame. This chamber is divided into numerous cells or compartments by means of transverse partitions, having alternately open spaces at top and bottom.

As the air escapes from the reel it enters this chamber and passes through each of the cells, being alternately deflected upward and downward by the partitions, in order that the fine flour carried off from the reel-chamber by the blast may be deposited. A pump or valve in the bottom of the chamber discharges the fine flour thus deposited either directly into a trough or into the reel-chamber, without in either case permitting the return or escape of the blast through the valve.

In the accompanying drawings, which rep

BEST AVAILABLE COPY

BEST AVAILABLE COPY resent a convenient arrangement of parts for carrying out the objects of my invention, my improvements are shown as applied to a bolting-chest consisting of two reels arranged side by side.

As the construction is the same in both, a description of one will be sufficient.

The reel in this instance extends the whole length of the chest, and turns freely in bearings in the bridge-trees $A^2$. The central shaft E, upon which the reel is supported, is solid, except at the end nearest the driving-gear, which end is hollow and bell-shaped inside the bearing. Heads or spiders $E^1$ are arranged upon the shaft E at right angles thereto, and are firmly braced and united by tie-rods $E^2$. A series of perforated tubes are arranged around the central shaft. These tubes $E^3$ in this instance are open at one end only, these open ends being inserted into the bell-mouth $E^4$. The bolting-cloths are secured to ribs $E^5$, inserted into slots in the reel-arms $E^1$.

Air is supplied to the reel in the following manner: The end of the reel-shaft nearest the driving-gear is hollow, and forms a close joint with the end of an air-tube, Q, leading from a fan, G; the shaft revolves freely, but the air-tube is stationary. The reel-chamber is divided into two compartments, of unequal size, by a partition, $E^7$, which encircles the reel, and fits snugly in a flanged wing, $e^4$, upon it. The larger of these two compartments is for the reception of the fine flour, which passes through the bolting-cloths, while the smaller one forms a dead-air chamber, $E^9$, into which the tailings or offal falls, a portion of the tail end of the reel being left open for that purpose.

The collecting-chamber H is divided into a number of compartments or cells by means of the transverse partitions $h$ $h'$. The partitions $h$ fit closely to the top of the chest, but do not extend quite to the bottom of the chamber, while the others, $h'$, are secured to the bottom, but do not reach the top, their lower edges being inserted into grooves in the valve-shaft I. The current of air passes from the bolting-chamber through an opening behind the spout C, which feeds the reel and enters the collecting chamber, through which it passes, being alternately deflected upward and downward by the partitions $h$ $h'$, thus forming eddies, which cause the flour or dust to settle in the cells upon the valve-shaft I, by which it is discharged.

The valve I, in this instance, consists of a rotating shaft, fitting accurately and turning freely in two concave blocks, whose inner sides are curved to suit it. The shaft I has a long slot cut entirely through it, into which a board, $i^1$, fits. The width of this board is somewhat less than the diameter of the shaft, and it fits closely in the slot, but is free to reciprocate transversely in it. Shallow annular channels or grooves $i^2$ are cut into the shaft at intervals. Brackets $i^3$, curved on their under sides, near their centers, to correspond with the grooves $i^2$, are secured upon the base-boards or concave blocks, and serve to hold the shaft and blocks together, and as a guide or cam to work the reciprocating board or plunger $i^1$. The arrangement of the brackets is such that, when the plunger-board $i^1$ is vertical, a cavity or channel, in which the fine flour is deposited, is left in the upper side of the shaft; but when the shaft revolves the board is pressed down, leaving a similar channel on the upper side, now uppermost, and forcing out the fine flour into a trough or conveyer below, through an opening between the concave blocks. In the present instance, however, for convenience of construction, the fine flour thus collected is dropped by the valve directly into the reel-chamber, where it mingles with the other flour.

After passing the whole length of the collecting-chamber the current of blast air may enter the air-trunk J, which leads to the fan G, and again be returned to the reel, or it may be permitted to escape at once to the open air.

The meal is supplied to the screen by means of a plunger, (shown at X, Fig. 2,) which takes it from the mouth of the supply-pipe and passes it into the bolting-chest against the pressure of the air by a positive feed. As the feed-pipe above the pump is vertical it will be filled with meal, which will prevent the escape of the air, while the reciprocating action of the plunger will cause the meal to be fed into the bolting-cloth without permitting the air to pass at the same time.

It is unnecessary herein more specifically to describe the construction of the pump, as that is fully shown in and covered by Patent No. 37,319, (another division of the original application,) and it forms no part in itself of the present case.

Another feed-valve is illustrated by the roller I, which is used to feed the fine particles from the collecting-chamber into the chest or into the trough, whence it is conveyed away without permitting the escape of the air. The meal is delivered out of the chest by a shaft-valve, Y, in all respects like the valve I, herein fully described, and need not be more particularly referred to, as it is fully shown and broadly covered by Patent No. 37,320, (another division of said original application,) and it forms in itself no part of the present case. Its construction must be such as to permit the escape of the flour by a positive discharge without allowing the air to pass at the same time.

It is deemed unnecessary to describe in detail the construction and operation of the other parts of the mechanism, as they form no part of the subject-matter herein claimed, and are, moreover, fully described in other applications filed simultaneously, and marked, respectively, A, B, C, and D.

What I claim as my invention, and desire to secure by Letters Patent, is—

1. In combination with the bolt and air-pipes and valves for feeding and delivering without allowing the air to pass therewith, the collecting-chamber for simultaneously

BEST AVAILABLE COPY feeding, separating, and delivering the flour, while the light particles carried with the current are deposited, and the blast continuously maintained, substantially as set forth.

2. In combination with the screen and blast and suction-pipes, the collecting or deposit chamber, wherein dead-air spaces are formed for the deposition of the specifically-heavier particles carried up by the atmospheric currents by gravity, substantially as set forth.

3. In combination with the screen and fan for inducing air-currents through the screen, the trapped feed, which prevents the passage of the air at the same time that it admits the meal to the chest, and the collecting or deposit chamber through which the air is forced, wherein the solid particles carried out by the current are deposited by gravity in the dead-air spaces, substantially as set forth.

In testimony whereof I have hereunto set my hand in presence of two subscribing witnesses.

W. F. COCHRANE.

Signed in presence of—
W. A. CASWELL,
R. MASON.